United States Patent [19]

Krug et al.

[11] 4,201,064
[45] May 6, 1980

[54] AIR CONDITIONER FOR A BUS

[75] Inventors: Martin Krug, Möglingen; Paul R. Bihl, Ditzingen, both of Fed. Rep. of Germany

[73] Assignee: Sutrak Transportkalte, GmbH & Co., Ditzingen, Fed. Rep. of Germany

[21] Appl. No.: 900,739

[22] Filed: Apr. 27, 1978

[30] Foreign Application Priority Data

May 7, 1977 [DE] Fed. Rep. of Germany ... 7714617[U]

[51] Int. Cl.² ............................................. B60H 3/04
[52] U.S. Cl. .......................................... 62/239; 62/244
[58] Field of Search ........................... 62/239, 241, 244

[56] References Cited

U.S. PATENT DOCUMENTS

| | | | |
|---|---|---|---|
| 2,032,572 | 3/1936 | Hammers et al. | 62/239 |
| 2,320,596 | 6/1943 | Henney | 62/244 |
| 2,784,568 | 3/1957 | Schjolin | 62/239 |
| 3,315,488 | 4/1967 | Lind | 62/241 |
| 3,528,607 | 9/1970 | Plackett et al. | 237/2 |
| 3,670,808 | 6/1972 | Wait, Jr. | 62/244 |
| 3,848,428 | 11/1974 | Rieter, Jr. | 62/244 |
| 3,862,549 | 1/1975 | Fernandes | 62/419 |
| 3,973,620 | 8/1976 | Stringer | 62/244 |
| 4,043,143 | 8/1977 | Fluder et al. | 62/244 |
| 4,051,691 | 10/1977 | Dawkins | 62/244 |

*Primary Examiner*—Lloyd L. King
*Attorney, Agent, or Firm*—Morgan, Finnegan, Pine, Foley & Lee

[57] ABSTRACT

An air conditioner unit adapted for mounting on the roof of a motor vehicle is shown. Two elongated condensor units are arranged side by side within the unit housing and extend along the longitude of the vehicle roof; two elongated evaporator units are arranged side by side within the unit housing behind the condensor units with respect to the forward direction of motion of the vehicle. Side walls of the unit housing are provided with openings so that air flowing substantially transversely to the longitudinal axes of the condensors can be received by the condensors. The invention provides for a motor vehicle air conditioning unit with low height and air resistance, but with large air intake capacity.

17 Claims, 6 Drawing Figures

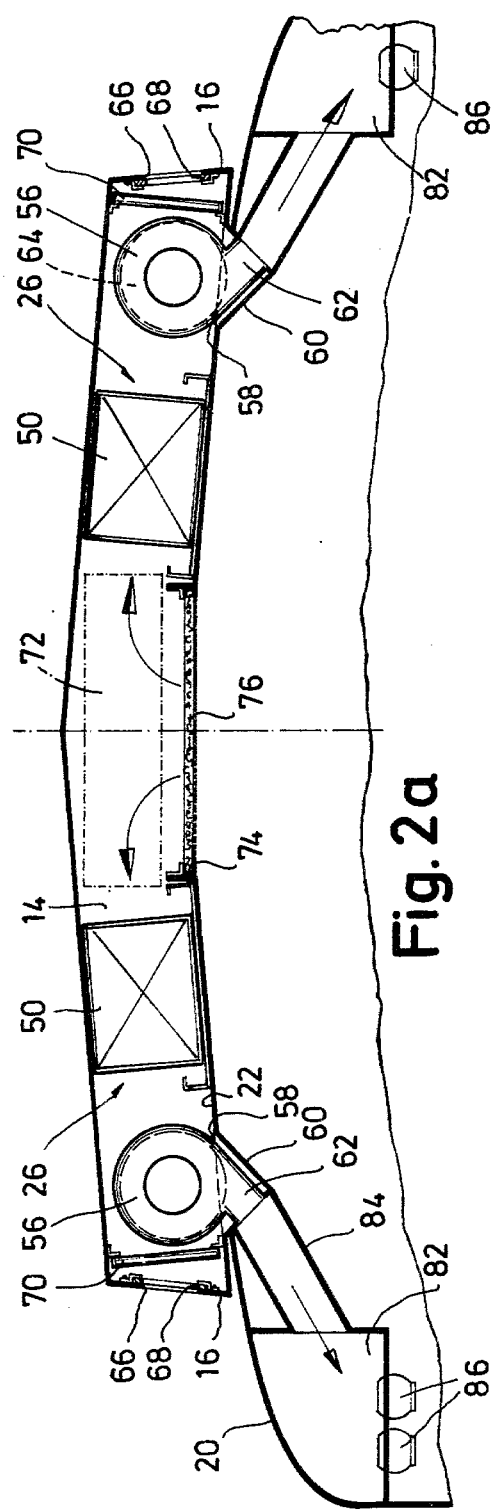
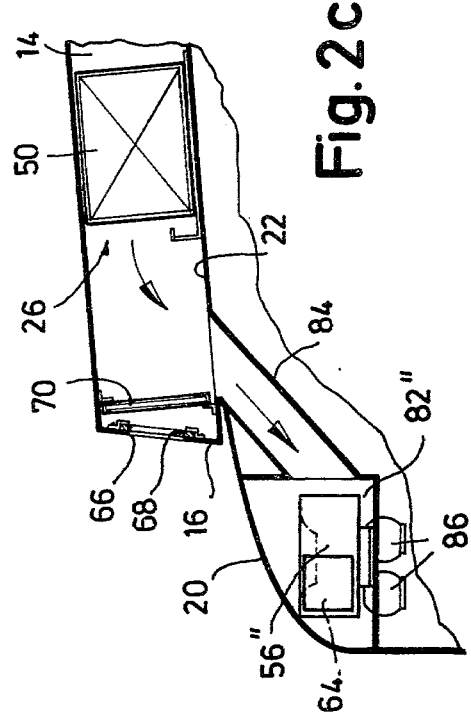
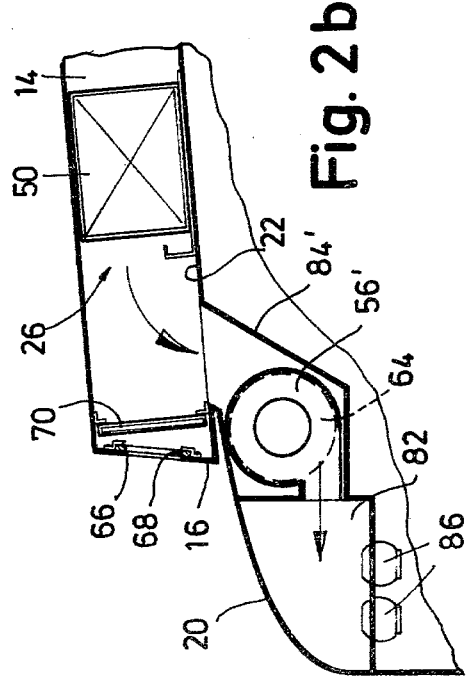

AIR CONDITIONER FOR A BUS

BACKGROUND AND OBJECTS OF THE INVENTION

The invention relates to an air conditioner to be mounted on the roof of the body of a bus, comprising a housing in which an evaporator unit and a condenser unit are mounted.

Known air conditioners of this kind comprise a block-shaped housing having in its front wall an air intake opening extending over practically the entire width of the housing, and a condenser unit mounted behind this opening. The width of the body of the bus limits the width of the air conditioner housing, and thus the length of the condenser unit, and since the latter cannot be made as low as convenient, in order to avoid too great a resistance against the air stream, the known air conditioners must be of relatively high configuration so as to ensure the necessary heat dissipation at the condenser unit. However, the large design height of the known air conditioners not only results in a considerable increase in the vehicle's air resistance, but also in a somewhat unesthetic appearance.

The object of the invention was to create an air conditioner for a bus having a lower design height than the known constructions, but without the disadvantage of an increase in the flow resistance against the air flowing through the condenser unit.

Departing from a known air conditioner to be mounted on the roof of the body of a bus, comprising a housing in which an evaporator unit and a condenser unit are mounted, this object is attained in accordance with the invention in that at least two condenser units extending at least approximately in the longitudinal direction of the body of the bus are arranged alongside each other. Since the bus dimensions put practically no restriction on the air conditioner housing in the longitudinal direction of the body of the bus, in such a construction the condenser units can be made long enough for their dimensions in the direction of the air stream passing through them not to have to be made larger than the condenser units of known air conditioners for buses, although they can be of substantially lower design height than the condenser units of the known constructions. This lower design height of the condenser units is the precondition of the decrease in the height of the air conditioner housing.

It is expedient to design and mount the evaporator units according to the same principles as the condenser units. It is therefore advisable to mount at least two evaporator units extending at least approximately in the longitudinal direction of the body of the bus alongside each other and behind the condenser units. The evaporator units can then be practically any length and thus of low and narrow configuration, and they do not hinder adaptation of the air conditioner housing to the curvature of the roof of the bus body.

It should be noted that in spite of a laterally positioned condenser unit whose entire width is therefore subjected to the motion dependent air flow at least one suction blower must still be mounted behind the condenser unit in the above-described known air conditioner, so as to also ensure adequate heat dissipation from the condenser unit in the event that the vehicle is standing or travelling at a slow speed. Consequently, the inventive construction does not involve any additional expenditure.

SUMMARY OF THE INVENTION

In a preferred embodiment of the inventive air conditioner the housing comprises air inlet openings which can be closed by check flaps on the inside of the housing at the two side walls adjacent to the condenser units or in the upper wall approximately above the latter. In this way, the condenser unit suction blower can provide all parts of the condenser units with cooling air in the shortest way when the vehicle is standing or travelling slowly. In the embodiment with closable air inlet openings cooling air entering at the front while the vehicle is travelling is prevented from partly leaving the housing again via the air inlet openings instead of flowing through the condenser units. If the travel speed dependent pressure head on that side of the condenser units against which the air flows in is not sufficient, the air inlet openings in the embodiment comprising check flaps are automatically opened by the suction of the blowers associated with the condenser units and are closed again by the pressure head after the vehicle has driven off. Since the housing is closed at the front between the condenser units, large dimensioned air inlet openings can be advantageously arranged at the side walls or in the upper wall of the air conditioner housing, which has a favorable effect on the delivery efficiency of the blowers associated with the condenser units. In the preferred embodiment of the inventive air conditioners the condenser unit blower(s) is(are) mounted between the condenser units, and the housing has at least one air outlet opening in its upper wall between the condenser units. If several blowers are used, these can be arranged in a row one behind the other, and in view of the low design height and the possibility of blowing the used air out at the top, it is advisable to use simple axial fans.

In a plan view the condenser units could, however, also be mounted in V-shaped arrangement so that the air stream flowing into the air conditioner housing from the front has a component along the lamellae or ribs of the condenser units.

If the two evaporator units are mounted in laterally spaced relationship they can accommodate a receiving area between them for electrical controls and/or refrigerant control devices. An air inlet opening through which the air to be cooled can be sucked in from the interior of the bus body can then be arranged in the housing beneath these devices. This has the great advantage that the electrical controls and the refrigerant control devices, such as refrigerant driers, sight glasses and expansion valves are simply and easily accessible from the interior of the bus and can be serviced. The electrical controls or the refrigerant control devices can be very simply secured by providing at least one support for these elements which traverses the evaporator units and may simply be placed on the evaporator units. This also prevents hindrance of the flow of air sucked in from the interior of the bus.

The measure of mounting the heat exchanger units approximately in the longitudinal direction of the bus body enables the housing to be of curved or bevelled configuration in line with the curvature of the roof of the body of the bus. This leads to a further decrease in the overall design height of the air conditioner, for while the known air conditioner housings which are of block-shaped configuration owing to the laterally arranged condenser units are laterally spaced from the curved roof of the bus body and therefore extend higher at the side than in the center area, the condenser units of the inventive air conditioner which are arranged in the longitudinal direction of the bus body enable the housing of the air conditioner to be adapted to the curvature of the roof, i.e., to be curved accordingly, or also be bevelled about the center longitudinal axis, so that it extends everywhere by approximately the same amount above the roof of the bus body. This measure has a particularly advantageous effect on the appearance of the body of the bus. The inventive design of the housing also ensures a better condensed water outflow. In the aforementioned known air conditioners, the blowers which are in the form of vertical radial blowers and convey the air cooled at the evaporator units into the interior of the bus body are mounted in their entirety in the air conditioner housing, and owing to their necessary diameter and their downwardly extending discharge nozzle necessitate a considerable minimum height for the air conditioner. In the case of the inventive construction it is suggested that at least parts of the evaporator unit blowers be mounted outside the air conditioner housing, as the inventor has ascertained the following: Since openings for the cooled air discharge channels of the air conditioner have to be cut in the roof of the body of the bus in any case, the blowers associated with the evaporator units can readily partly extend into these openings. However, it is also possible to insert these blowers in the air intake channels between these openings and the air distribution channels at both sides of the bus, or to even arrange them in the air distribution channels, in which case it is expedient for them to have a vertical fan wheel axis.

If fresh air is to be mixed with the circulated cooled air, it is advisable to provide the housing with air inlet openings at the two side walls or in the upper wall adjacent to the evaporator units. These inlet openings have a controllable closure means which can be either permanently fixed or adjustable. In this way, the fresh air need not flow through the condenser units, which owing to the eliminated flow resistance ensures as great a supply of fresh air as possible, for example, when the cooling is switched off. However, arranging the air inlet openings in this manner is also advantageous if, in accordance with the invention, at least one heater is disposed behind these openings to heat the upper regions of the bus interior and defrost the windows. In this way, the roof heating and devices for supplying fresh air, which are otherwise installed in the bus, can be eliminated.

Since the air distribution channels in the bus interior extend at the two side walls of the bus body, and the cooled air must be supplied to them, the lengthwise arrangement of the evaporator units is particularly advantageous for it is then possible to provide one respective chamber between each evaporator unit and the corresponding side wall. At least one blower protruding from the bottom of the housing with at least one discharge nozzle is mounted in the chamber. However, normally several blowers are mounted in spaced relationship one behind the other in each chamber. The chambers arranged adjacent to the outer walls of the evaporator units are therefore located directly above the air distribution channels of the body of the bus, so that the entire cooled air need not be introduced into the bus interior via a single relatively small opening. Also, the discharge nozzles of the radial blowers form at least part of the air intake channels leading to the air distribution channels.

It was hitherto customary to cut in the roof of the bus body special openings for refrigerant lines, electric cables and water connecting means leading to the air conditioner. In a preferred embodiment of the inventive air conditioner the housing of the latter does, however, have on its underside several cooled air discharge channels or chutes extending downwardly therefrom which are so dimensioned that they can also accommodate the connections for refrigerant lines, electric connecting means and water connecting means. Separate openings for these connecting means need therefore not be cut in the roof of the body of the bus.

Since the blowers urging the cooled air into the interior of the bus and thus also the cooled air discharge chutes are arranged in longitudinally spaced relationship, the roof crossbeams extending in the roof of the bus and mounted in longitudinally spaced relationship are also not disturbingly noticeable as the chutes can be mounted between the respective crossbeams.

Associating at least one respective evaporator unit with each air distribution channel extending along the bus body also offers the possibility of operating the refrigerant circuit in a particularly expedient manner: In known air conditioners for buses, a special refrigerant circuit with compressor and evaporator is provided for each side of the bus. If one compressor breaks down, one side of the bus can still be cooled, but there is no cooling whatever for the other side.

If, on the other hand, in the inventive air conditioner the capacity of half a refrigerant circuit is associated with each side of the bus and thus each evaporator unit, one of the two compressors can break down without one side of the bus remaining completely uncooled. The capacity can also be particularly simply regulated since in the event of low cooling requirement one of the two compressors or in the case of multi-cylinder compressors, some of the cylinders of the latter can simply be put out of action. Continously uniform temperature distribution in the bus is therefore ensured.

The various principles underlying the invention could not have been made obvious by the prior art since they have not been even remotely realized in air conditioners to be mounted on buses, including air conditioners to be installed subsequently on buses, and were not used in other air conditioners for buses in a manner that might have suggested to the designer how he could construct a mountable air conditioner of flat configuration. An air conditioner for buses installed in the interior of the bus body is known wherein two condenser coils are arranged one behind the other in the longitudinal direction of the bus, and are located above an evaporator coil, which is likewise substantially longitudinally oriented, however, the disadvantages of this construction are obvious: unfavorable cooling conditions at the rear condenser and large design height.

In a further known air conditioner for vehicles which is built into the front of the body roof, two longitudinally oriented condensers are located alongside each other. They are exclusively supplied with cooling air by two radial blowers mounted between them and behind each other. The cooling air is sucked in by the blowers through openings located at the sides of the body and after flowing round the condensers is ejected through a central opening in the roof. That no importance whatever was attached to a low design height when this known construction was conceived is evident from the fact that the compressors and drive motor are mounted in the form of a laterally positioned unit of high configuration behind the condensers. Consequently, this prior art provided no suggestions as to how the object underlying the invention might be attained. Furthermore, this known air conditioner comprises a laterally arranged evaporator.

A further known air conditioner for a bus is built into the rear of the roof. Here, two longitudinally oriented evaporator units are mounted alongside each other and accommodate between them an air inlet opening for the air to be cooled. However, between this inlet opening and the evaporator units there are blowers of relatively high configuration located in their entirety above the level of the inlet opening and therefore determining the design height. In addition, a condenser unit arranged laterally in relation to the longitudinal direction of the bus is mounted in the bottom part of the bus body. For this reason alone, this known construction could not have inspired the design of a subsequently mountable system.

Finally, an air conditioner for a bus is known wherein two longitudinally oriented evaporators on each side of the body are built into air channels extending in the longitudinal direction within the roof area. In this case too, the condenser is mounted in the bottom body area. This system therefore does also not assist in attaining the object underlying the invention. Further features, details and advantages of the invention are to be found in the enclosed claims and/or the following description and attached drawings of a preferred embodiment of the inventive air conditioner and also two variants.

BRIEF DESCRIPTION OF THE DRAWINGS

FIG. 2a is a sectional view of the air conditioner along line 2—2 in FIG. 1, where the upper part of the body of a bus serving to support the air conditioner is also represented schematically.

FIGS. 2b and 2c are two variants of the embodiment shown in FIG. 2a.

DESCRIPTION OF THE PREFERRED EMBODIMENTS

Figure 1:
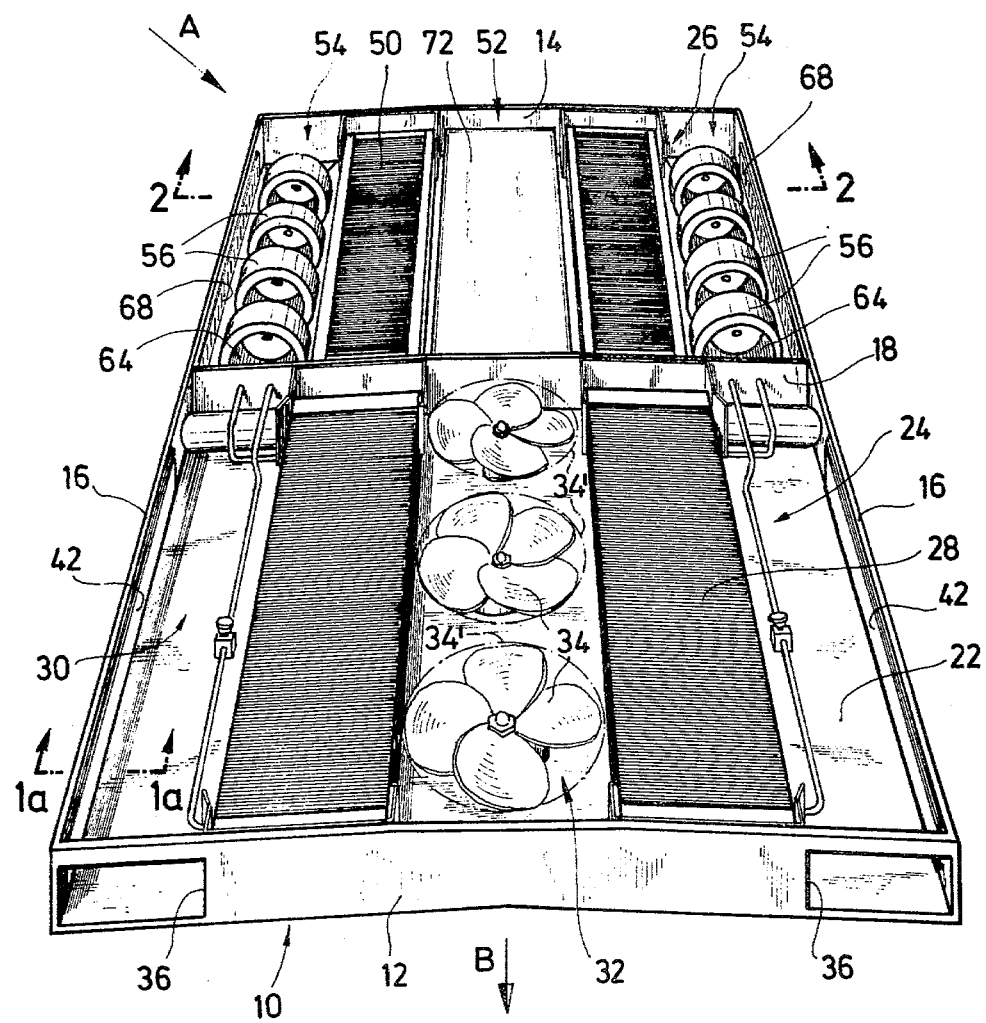
FIG. 1 is a front elevational view of the air conditioner after removal of an upper wall of the housing.

FIG. 1 shows a housing which is designated in its entirety by reference numeral 10 and, in addition to an upper wall which has been removed and is not illustrated, comprises front and rear walls 12 and 14, respectively two side walls 16 and a center partition 18. As is clearly apparent from FIGS. 1 and 2a, the housing 10 is not strictly block-shaped, but is bevelled about its longitudinal axis in accordance with the curvature of a roof 20 of a bus body shown in FIG. 2a, such that a bottom portion 22 of the housing 10 and the non-illustrated upper wall comprise on either side of the center longitudinal axis outwardly and downwardly inclined portions extending at, for example 3° with respect to the horizontal. The partition 18 divides the housing interior into a condenser area 24 which in the longitudinal direction (B) of the bus body is located at the front, and an evaporator area 26 located therebehind.

Figure 1A:
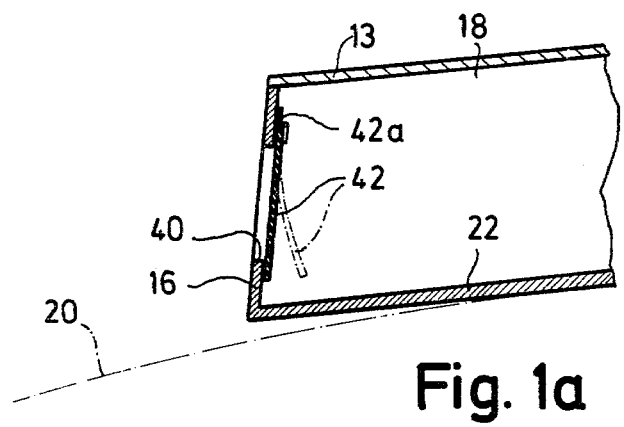
FIG. 1a is a fragmentary sectional view along line 1a—1a in FIG. 1 on an enlarged scale.

Two condenser units 28 extending in the longitudinal direction (B) of the bus body and comprising laterally extending ribs or lamellae are arranged in laterally spaced relationship in the condenser area 24 and divide it up further: Air intake chambers 30 are formed between the two condenser units and the side walls 16, and between the condenser units a blower chamber 32 in which three electrically driven vertical axis blowers 34 are arranged one behind the other. At each of the front ends of the air intake chambers 30 the front wall 12 of the housing 10 has an air inlet opening 36 via which cooling air flows during travel into the air intake chambers 30 from where it flows through the condenser units 28 and then arrives in the blower chamber 32. Since the air intake openings 36 are relatively small it is advisable to provide in the front portion of the side walls 16 longitudinal air inlet openings 40 via which the axial blowers 34 can suck in cooling air for the condenser units 28 when the bus is standing or travelling at a low speed. In order that the air flowing in through the air intake openings 36 during travel does not leave the air intake chambers 30 immediately again via the air inlet openings 40, check flaps 42, for example, flexible rubber flaps, are secured at 42a to the inside of the side walls 16 so as to open automatically when the rotating axial blowers 34 produce a negative pressure in the air intake chambers 30, and so as to be also closed automatically when the motion dependent air flow builds up a pressure head in the air intake chambers 30. The cooling air which takes away the heat from the condenser units 28 leaves the housing 10 through openings 34' indicated by dot-and-dash lines in FIG. 1 and arranged above the axial blowers 34 in the upper wall 13 of the housing which is not illustrated in FIG. 1 (see FIG. 1a). The air inlet openings 40 could, of course, also be arranged in the upper wall of the housing, for example, above the air intake chambers 30 or immediately above the condenser units 28.

Two evaporator units 50 likewise extending in the longitudinal direction of the bus body and comprising ribs or lamellae extending laterally in relation thereto are located in the evaporator area 26 behind the condenser unit 28. These evaporator units are arranged in laterally spaced relationship and divide the evaporator area 26 up into a center installation chamber 52 and two side blower chambers 54 in each of which four radial blowers 56 are vertically mounted, i.e., with a horizontal axis, in spaced arrangement one behind the other. As is apparent from FIG. 2a, the bottom portion 22 of the housing 10 comprises under each of these radial blowers an opening 58 at whose edges the walls of a downwardly and outwardly inclined chute 60 are welded. Extending into these chutes are the discharge nozzles 62 of the radial blowers which do, however, also engage the openings 58 with parts of their fan wheels 64 and the housings surrounding these.

Adjacent to the radial blowers the rear areas of the side walls 16 comprise longitudinal inlet openings 66 which should be grill openings which can be closed either partly or fully in a controlled manner by slides 68 having corresponding grill openings. These slides can be manually adjustable, but can also be remote-controllable slides. Behind each inlet opening is a heater 70 which can be connected to a hot water circuit.

The electrical controls and the refrigerant control devices of the air conditioner are to be arranged in the installation chamber 52. However, for reasons of simplicity, these components were not illustrated in the drawings, but rather indicated by a block 72 in FIGS. 1 and 2a. A plate on which the various devices are hung can serve to support them in the installation chamber 52. The simplest way is to place the plate on the condenser units 50 so that it need only be secured against displacement. This arrangement of the electrical controls and the refrigerant control devices has the advantage that an air inlet opening 74 can be arranged in the center of the roof 20 of the bus body beneath the air conditioner and the air to be cooled can be sucked in through this opening from the interior of the bus body, so that the electric controls and the refrigerant control devices can easily be made accessible from the interior of the bus by removing an intake grill 76 secured in the air inlet opening 74.

Figure 3:
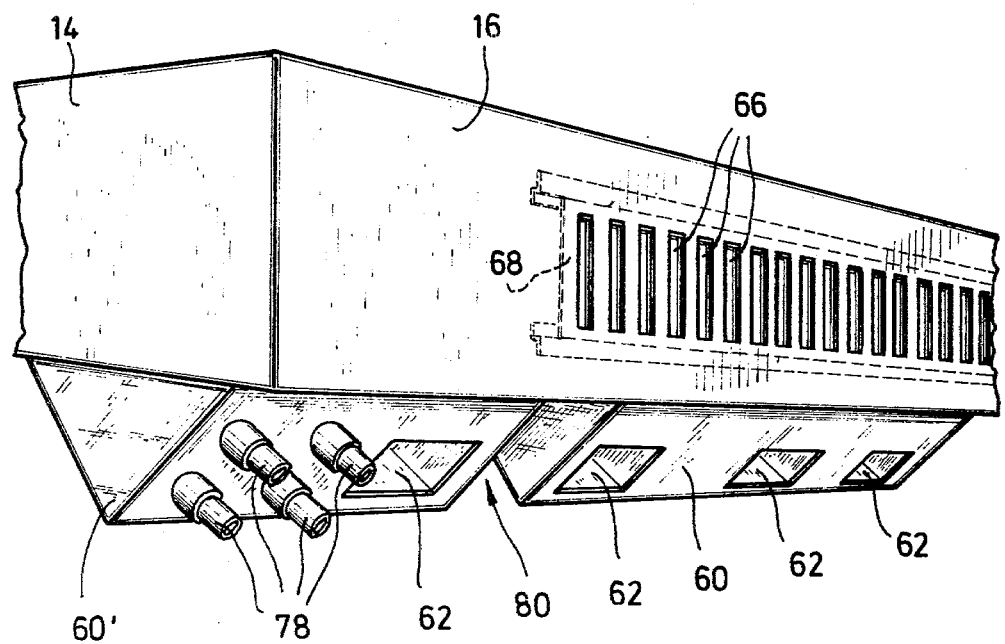
FIG. 3 is a bottom rear view of a corner area of the air conditioner, as indicated by arrow A in FIG. 1.

One or several of the chutes 60 can be used for also accommodating the connections for refrigerant lines, electrical cables and water inlet and outlet lines, so that no special openings for these connections need be cut in the roof 20 of the bus body. This is apparent from FIG. 3 showing several line connections 78 protruding from the chute 60' at the—according to FIG. 1—rear corner of the housing 10. It is also evident from FIG. 3 that the space between the discharge nozzles 62 of the radial blowers 56 enables provision of gaps 80 between the chutes 60 and 60' associated with the discharge nozzles through which crossbeams of the roof 20 of the bus body extend so that these do not prevent the inventive air conditioner from extending along a relatively large lengthwise area of the roof of the bus body and from engaging the roof of the body of the bus with some of its parts.

Air distribution channels 82 to which the discharge nozzles 62 of the radial blowers 56 are connected via air intake channels 84 extend at both sides of the bus body beneath the roof 20 of the bus body. The adjustable air nozzles 86, known per se, are then located at the bottom of the air distribution channels. The air distribution channels 82 also supply defrosting nozzles, not illustrated, for the side windows of the bus body.

The air to be cooled is sucked in through the air inlet grill 76 by the radial blowers 56 from the interior of the body of the bus and through the evaporator units 50. The cooled air is then blown into the lengthwise extending air distribution channels 82 via the discharge nozzles 62 and the air inlet channels 84. If fresh air is to be mixed with the circulated air, the slides 68 behind the inlet openings 66 simply need to be adjusted accordingly. On fully opening the inlet openings 66 an optimum fresh air supply is obtained since the fresh air need not be conveyed through the condenser units and so their flow resistance cannot be of effect. The same applies to supplying heated fresh air which can be produced and conveyed into the air distribution channels 82 by passing hot water through the heater 70. In this way the upper part of the bus interior can be heated well and the side windows defrosted without the necessity of a special heating system.

FIGS. 2b and 2c are variants showing that radial blowers 56' and 56" corresponding to the radial blowers 56 can also be mounted entirely in the air inlet channels 84' or the air distribution channels 82". In the latter case, an assembly with a vertical fan wheel axis is recommended. Since the remaining parts of the variants shown in FIGS. 2b and 2c are identical to the embodiment shown in FIG. 2a there is no need to describe these two variants in further detail.

The basic concept of the arrangement of the air conditioner components is also advantageous in the event of the air conditioner housing not being curved or bevelled.

We claim:

1. An air conditioner unit adapted to be mounted on the roof of a motor vehicle, said unit comprising a housing with a front wall, two side walls and an upper cover, at least two elongated condensor units being arranged side by side within said housing behind its front wall and extending substantially parallel to said side walls, at least two elongated evaporator units being arranged side by side within said housing behind the condensor units and extending substantially parallel to said side walls, said at least two condensor units being parallel to said side walls, said at least two condensor units being adapted to receive air flowing substantially transversely to their longitudinal axes and parallel to said upper cover, and means for directing such transversely flowing air toward the condensor units.

2. An air conditioner unit as claimed in claim 1 wherein said housing is provided with at least one opening in the front wall, and at least one blower is associated with the condensor units and mounted in said housing, and wherein longitudinal air inlet openings for the condensor unit blower are located in the front portion of the housing adjacent the condensor units.

3. An air conditioner unit as claimed in claim 1 wherein a blower associated with said condensor units is mounted between the condensor units and at least one air outlet opening is provided in the upper cover of the housing between the condensor units.

4. An air conditioner unit as claimed in claim 1 further comprising an air intake chamber between each condensor unit and the adjacent housing side wall, and air intake openings in the front wall of the housing at the front ends of the air intake chambers.

5. An air conditioner unit as claimed in claim 1 wherein the evaporator units are mounted in laterally spaced arrangement, forming between them a receiving area for refrigerant and electrical control devices, and wherein the housing is provided with an air inlet opening beneath said receiving area.

6. An air conditioner unit as claimed in claim 1 wherein the housing is curved for mounting on a motor vehicle having a curved roof.

7. An air conditioner unit as claimed in claim 1 wherein the longitudinal side walls of the housing are provided with adjustable air inlet openings.

8. An air condensor unit as claimed in claim 1 wherein at least two discharge chutes for cooled air are provided on the lower side of the housing and project downwardly therefrom and which are adapted for encasing refrigerant lines, electrical connecting means and water connecting means.

9. An air conditioner unit as claimed in claim 1 wherein a chamber is provided between each evaporator unit and the adjacent longitudinal side wall, an evaporator blower being mounted in said chamber so that at least one discharge nozzle of said blower protrudes from the bottom of the housing.

10. An air conditioner unit as claimed in claim 2 wherein the air inlet openings are closable.

11. An air conditioner unit as claimed in claim 7 further comprising heating means mounted behind the air inlet openings.

12. An air conditioner unit as claimed in claim 10 wherein the air inlet openings are closable by means of check flaps mounted on the inside of the housing.

13. An air conditioner unit as claimed in claim 3 wherein several condensor unit blowers designed as vertical axes fans are provided and wherein said vertical axes fans are mounted in a row one behind the other.

14. An air conditioner unit as claimed in claim 1 further comprising a blower for each evaporator unit, wherein each said evaporator blower is located at least partly outside the housing.

15. An air conditioner unit as claimed in claim 9 wherein several evaporator blowers are mounted in spaced relationship one behind the other in each of said chambers.

16. An air conditioner unit as claimed in claim 7 wherein the adjustable air inlet openings have an adjustable closure and said openings are provided at both longitudinal sidewalls of the housing.

17. An air conditioner unit as claimed in claim 7 wherein the adjustable air inlet openings have an adjustable closure and said openings are located in the upper wall of the housing adjacent to the evaporator units.